United States Patent

[11] 3,561,732

| [72] | Inventor | Anthony S. Pulcini<br>21 Elwood Road, Kensington, Conn. 06037 |
|---|---|---|
| [21] | Appl. No. | 768,250 |
| [22] | Filed | Oct. 17, 1968 |
| [45] | Patented | Feb. 9, 1971 |

[54] DETACHABLE GOOSENECK TRAILER WITH SELF-CONTAINED ELEVATING MEANS
3 Claims, 5 Drawing Figs.

| [52] | U.S. Cl. | 254/86, 280/150.5 |
|---|---|---|
| [51] | Int. Cl. | B60s 9/02 |
| [50] | Field of Search | 254/86; 280/402, 475, 150.5 |

[56] References Cited
UNITED STATES PATENTS

| 2,016,468 | 10/1935 | Wagner | 254/86 |
|---|---|---|---|
| 3,288,436 | 11/1966 | Silva | 254/86 |

*Primary Examiner*—Othell M. Simpson
*Assistant Examiner*—David R. Melton
*Attorney*—McCormick, Paulding and Huber

ABSTRACT: A low bed trailer is provided with a detachable gooseneck for connecting the bed portion of the trailer to the fifth wheel of a conventional tractor, and the forward end of the trailer bed has an elevating support which includes a pair of side-by-side hydraulic cylinders adjacent to the other underside of the floor of the trailer bed, and a toggle link means driven from a self-contained hydraulic system to move a foot toward and away from the trailer bed for raising and lowering the bed.

PATENTED FEB 9 1971
3,561,732
SHEET 1 OF 2
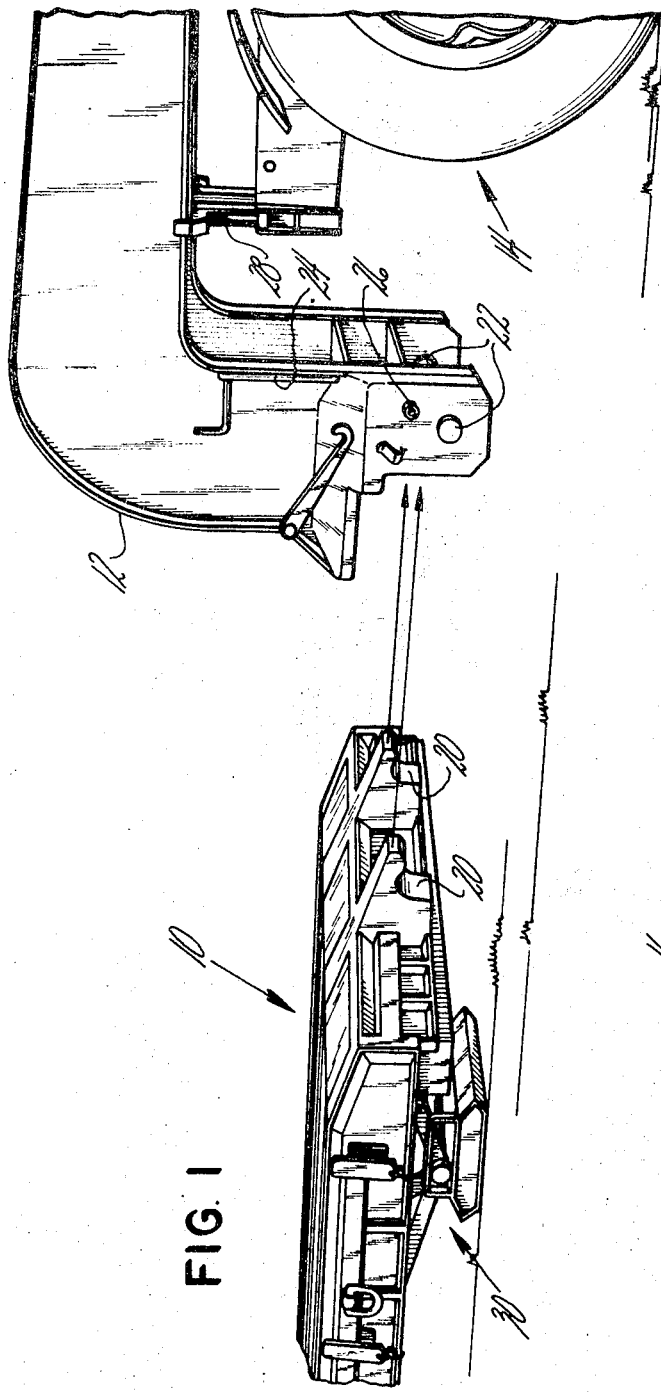
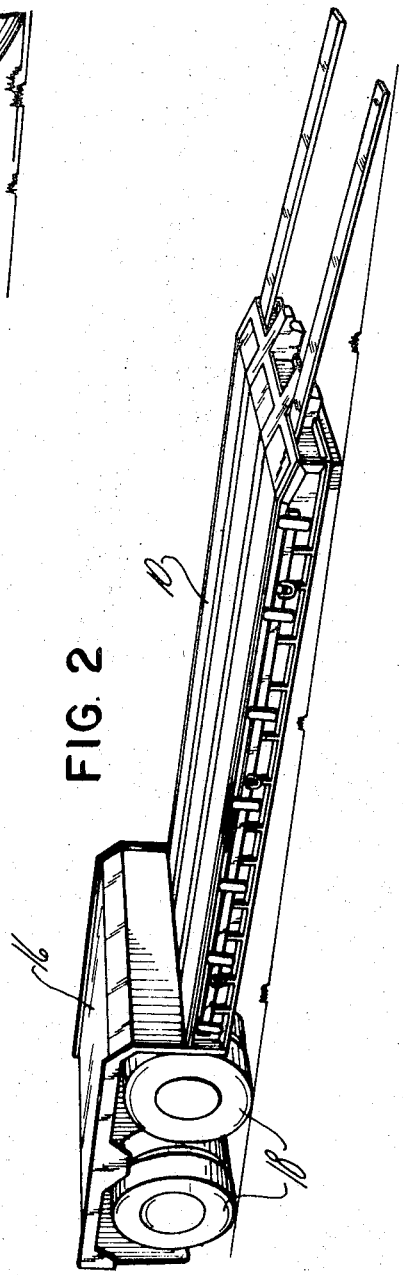
INVENTOR.
ANTHONY S. PULCINI
BY
*McCormick, Paulding & Huber*
ATTORNEYS

3,561,732

DETACHABLE GOOSENECK TRAILER WITH SELF-CONTAINED ELEVATING MEANS

SUMMARY OF INVENTION

This invention relates to low bed trailers, and deals more particularly with a self-contained mechanism for elevating and for lowering the bed portion of the trailer after the gooseneck has been disconnected so that heavy equipment can be conveniently loaded or off loaded without the benefit of the tractor and its associated power plant.

Trailers of the type disclosed herein are of relatively heavy duty design due to the fact that they must carry considerable loads upon a single continuous bed having sufficient length to accommodate all the various types of construction equipment likely to be carried. Because of the heavy loads which must be carried by such a trailer, its rear carriage structure comprises a plurality of pneumatic tires usually of considerable size, requiring a raised rear deck portion of the bed. The bed portion itself is usually disposed in a plane below the raised rear deck so as to provide a convenient minimum loading height which will also allow sufficient vertical clearances above the vehicles that are to be transported upon the trailer in order that the entire apparatus provide sufficient clearance below bridges or other structures normally found over roadways. The trailer hitching structure normally provided for connection with the fifth wheel of a tractor vehicle also extends vertically upwardly from the bed and forwardly so as to be located at a proper elevation for contacting the fifth wheel bearing structure of the tractor.

Thus, the bed portion of the trailer is cradled between the rear deck and the forward gooseneck structure at least when the trailer is in transportable condition. In some low bed trailers the hitching structure, or gooseneck can be readily disconnected from the bed portion of the trailer, but of course the bed portion must then be suitably supported prior to disconnecting the trailer and must normally be provided with jacks located adjacent to the forward end of the trailer for raising and lowering the trailer for purposes of loading and off loading heavy equipment. Hydraulically operated vertically oriented cylinder jacks have been proposed for this purpose, but these usually permit only very limited clearance between the bottom of the cylinder and the roadway and hence, do not usually comprise a permanent part of the trailer itself. Also, such hydraulic units are usually operated by remote power sources, as for example from a power source provided in the tractor.

In accordance with the present invention, a self-contained hydraulic system is provided in the trailer, and a novel elevating mechanism is permanently mounted to the under side of the bed portion of the trailer adjacent its forward end for raising and lowering the trailer without the necessity for an external power source.

BRIEF DESCRIPTION OF THE DRAWING

FIG. 1 is a perspective view of the forward portion of a trailer bed provided with an elevating mechanism constructed in accordance with present invention, and also shows the gooseneck portion of such a trailer detached and mounted to the fifth wheel of a tractor. FIG. 2 is a perspective view of the trailer shown in FIG. 1 with its forward end lowered to a position for loading.

DETAILED DESCRIPTION

Figure 3:
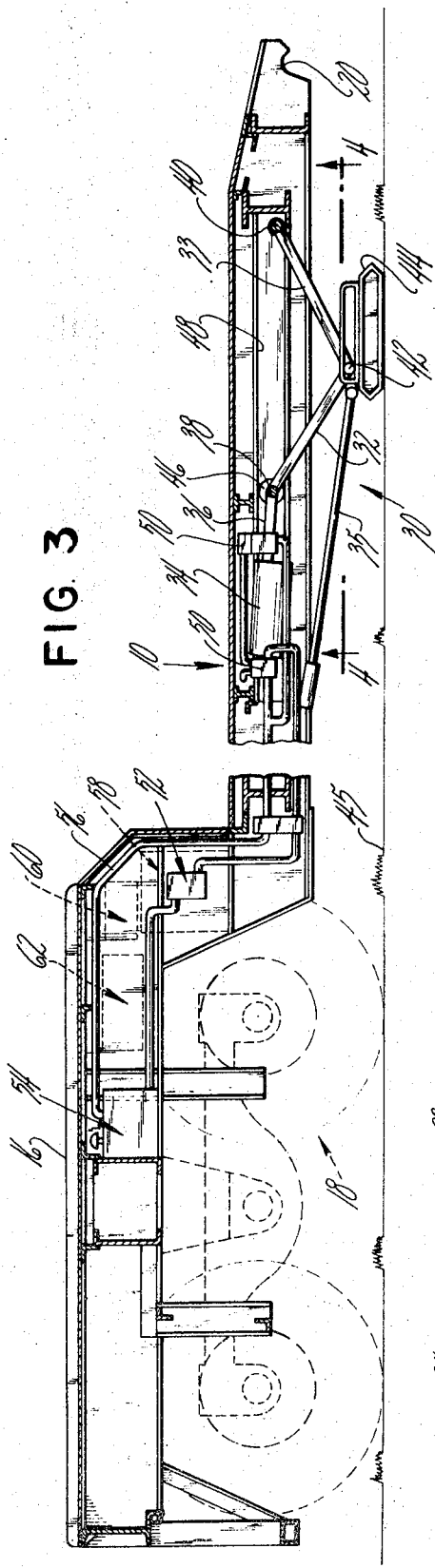
FIG. 3 is a vertical sectional view through the trailer showing the self-contained hydraulic system below the rear deck of the trailer, and showing the elevating mechanism adjacent the forward end thereof in its extended position.

FIGS. 1 and 2 show a low bed trailer of the type having a detachable gooseneck 12 for releasably securing or hitching the trailer to a tractor 14. The bed portion 10 of the trailer includes an elevated rear deck portion 16 for enclosing the wheels 18, which in the embodiment shown comprise fore and aft trucks of dual wheels. Each truck includes a common axle with sufficient space being provided above the forward axle and between the forward pairs of wheels for accommodating a self-contained hydraulic system to be described.

The forward end of the trailer bed 10 defines a pair of conventional supports 20, 20 for engaging a cross shaft 22 provided in the depending portion of the gooseneck 12. Locking pins 24, 24 are provided for insertion in the openings 26, 26 for locking the gooseneck to the forward end of the trailer bed. In the position shown in FIG. 1, namely with the gooseneck detached, means 28 is provided for supporting the gooseneck. Said means 28 preferably comprises a conventional bracket 28 which engages the tractor frame to hold the gooseneck in the elevated position shown.

Figure 5:
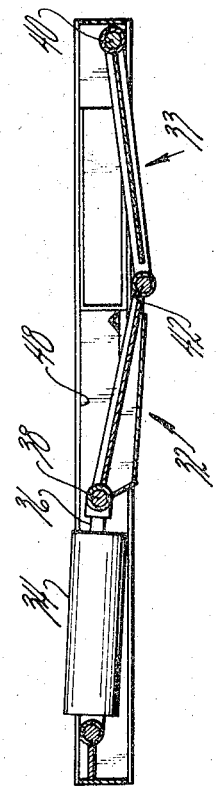
FIG. 5 is a sectional view taken along the line 5—5 of the FIG. 4.
Figure 4:
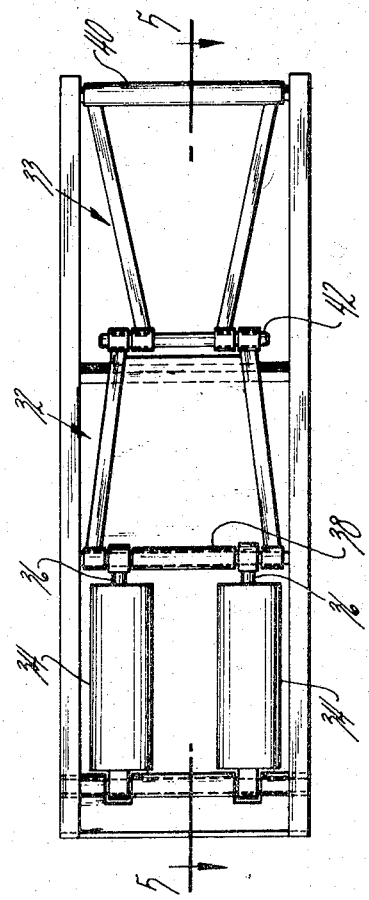
FIG. 4 is a sectional view of the elevating mechanism shown in FIG. 3 taken on line 4—4 of FIG. 3, but showing the mechanism retracted.

The trailer elevating mechanism 30 comprises toggle link means 32 and 33 movable from and to the extended position shown in FIG. 3 by a hydraulic cylinder 34 and piston rod 36 pivotally connected to one end of the aft link 32 as shown at 38. The opposite end 30 of the toggle, and more particularly of the forward link 33 is pivotally mounted to the frame of the trailer bed as shown at 40 in FIG. 3. The knee portion 42 of the toggle means carries a foot or base portion 44 for engagement with the ground 45. The connection 38 between the piston rods 36, 36 and aft link 32 of the toggle comprises a cross member having rollers 46, 46 at either end for riding in generally horizontally extending tracks 48, 48 defined in the frame of the trailer bed. As so constructed and arranged the introduction of fluid under pressure to the rear side of the piston causes the piston rod 36 to extend with respect to the pivotally mounted cylinder 34, moving the toggle link means from the piston shown in FIG. 5 to that shown in FIG. 3. Thus, the hydraulic cylinder is pressure operated in at least one direction to extend the trailer elevating means 30, and preferably is fluid pressure operated in the opposite direction also to retract the elevating means 30.

As shown in FIG. 3, the foot or base portion 44 is slidably mounted on the knee portion 42 so that the base portion can remain stationary during extension and retraction of the elevating means while the trailer itself pivots about its wheels 18. In order to properly position the foot or base portion as it is retracted off the ground, subsequent to an on loading for example, a spring loaded strut 35 urges the base 44 toward the position shown in FIG. 3. A compression spring in the upper end of the strut 35 urges the base 44 toward this position but allows the trailer to shift relative to the base as described above during trailer raising and lowering operations.

Considering next the self-contained hydraulic system of the present invention in greater detail, FIG. 3 shows hydraulic lines communicating with both sides of the cylinder 34, and hand operated control valves 50, 50 for directing fluid under pressure from a pump 52 to one or the other sides of the piston. The pump 52 draws hydraulic fluid from a reservoir 54 to which a return line 56 supplies return fluid from the suction side of the cylinder 34. The pump 52 is driven by a gasoline engine 58 which has its own battery 60 for starting purposes, and its own fuel supply 62 all of which are provided between the forward wheels beneath the rear deck 16 of the trailer as mentioned above. A hinged door in the deck provides access to these components, and protects them from damage during the actual hauling operation of the trailer.

I claim:

1. A mechanism for raising and lowering one end of a detachable gooseneck trailer frame, said mechanism comprising a pair of fluid motors arranged in side-by-side relationship adjacent the under side of the frame, means connecting the movable portions of said fluid motors, track means for confining said fluid motor movable portions to linear movement generally toward and away from the end of the trailer frame, a ground engageable foot portion, toggle link means defining a knee portion, said knee portion being slidably mounted on said foot portion, a strut pivotally extending between said trailer frame and said foot portion to position the foot during raising and lowering of the trailer, said toggle link means including a first link pivotally connected to said fluid motor connecting means, and a second link pivotally connected to said trailer frame, whereby linear movement of said movable fluid motor portions causes limited horizontal sliding movement of said knee portion but not of said foot portion during raising and lowering of said trailer.

2. The combination defined in claim 1 wherein said strut comprises an elongated member having a telescoping portion which includes a spring to urge said foot portion away from said fluid motors during raising and lowering of the trailer.

3. The combination defined in claim 2 wherein said means connecting said movable fluid motor portions comprises a cross member having rollers rotatably mounted adjacent its end portions, and said track means comprising parallel channel members fixed in the underside of said frame.